United States Patent

[11] 3,599,895

[72] Inventor Gustav Janecka
Jackson Heights, N.Y.
[21] Appl. No. 798,037
[22] Filed Feb. 10, 1969
[45] Patented Aug. 17, 1971
[73] Assignee Neptune Meter Company
New York, N.Y.

[54] TAPE CARTRIDGE LATCHING MECHANISM
4 Claims, 10 Drawing Figs.

[52] U.S. Cl. 242/198
[51] Int. Cl. G11b 23/10
[50] Field of Search 242/199, 200, 198, 197, 71.2, 71.1, 55.19 A; 179/100.2; 274/4, 11

[56] References Cited
UNITED STATES PATENTS

| | | | |
|---|---|---|---|
| 3,243,134 | 3/1966 | Reed et al. | 242/55.19 (A) |
| 3,497,157 | 2/1970 | Hanes et al. | 242/188 |

FOREIGN PATENTS

| | | | |
|---|---|---|---|
| 1,094,401 | 12/1954 | France | 242/200 |
| 1,422,937 | 11/1965 | France | 242/198 |

*Primary Examiner*—George F. Mautz
*Attorneys*—Robert S. Dunham, P. E. Henninger, Lester W. Clark, Thomas F. Moran, Gerald W. Griffin, Howard J. Churchill, R. Bradlee Boal, Christopher C. Dunham and John F. Ohlandt, Jr.

ABSTRACT: A tape recorder, particularly for purposes of recording data, comprising a tape cartridge which is adapted to fit, in the manner of a drawer, into a compartment in a recorder housing. The recorder housing contains the required elements for magnetically recording the data. The tape cartridge is latched into operating position within the compartment by a latching mechanism which includes the provision of spring loading for the brake and drive shafts of the recorder so that they may be readily retracted upon insertion and removal of the tape cartridge. The shafts are placed into driving relationship with the tape reels upon full insertion of the cartridge into its compartment.

Also provided is a spring mechanism contained within the cartridge casing which is operative to perform a number of functions. The spring mechanism is effective to operate a brake against the tape reels when the cartridge is out of its compartment, and to release the brake when the cartridge is inserted. The spring mechanism is also effective to bias a pressure roller such that it holds the recording tape against the capstan in the recorder housing. The spring mechanism also acts when the latching mechanism is released to force the pressure roller against the capstan, thereby to kick out the cartridge a short distance from its compartment.

INVENTOR
GUSTAV JANECKA
BY Lester H. Clark
ATTORNEY

TAPE CARTRIDGE LATCHING MECHANISM

BACKGROUND, OBJECTS AND SUMMARY OF THE INVENTION

This invention relates to magnetic recording, and more particularly, to apparatus for providing the recording of data on magnetic tape, especially in an environment where the data has to do with the reading of utility meters and the like.

In the context of obtaining information relating to the condition of a utility meter, it has been found highly desirable to attempt to eliminate most of the human errors involved in visually observing the condition of the meter and then writing down the information. What has been proposed is that by suitable means the meter readings be converted from analogue to digital information, or in other words, from meter shaft positions to the form of coded electrical signals, representative of such positions, which can then be recorded, typically by magnetic recording apparatus.

In an environment where one seeks to record data from utility meters and the like, it is possible to take advantage of certain previous developments in the art. Thus, since it is desired that a very simple device be carried by the meter reader and that it be quickly and easily set up for operation in order to obtain the reading of a particular meter at a given station, certain well-known designs are judiciously exploited. For example, since it is an important requirement that the handling of tape be minimized, particularly, that threading of tape on tape reels be eliminated, a tape cartridge or magazine, similar to types that have become popular recently, is employed. For background information on aspects of recording and reproducing that are shared by both data recording and audio or sound recording, reference may be made to U.S. Pat. to Andrews, No. 3,027,109. Another patent that may be referred to is U.S. Pat. to Moore, No. 3,285,526.

However, despite the aspects common to data recording and sound recording, it happens that in the field of data recording, relating to the reading of meters or the like, a number of additional, and especially severe, requirements are imposed which are not critical matters in sound recording. Because the data being handled reflects consumption by a customer, the billing based upon the data must be very accurate for good customer relations. Therefore, it is extremely important to provide a high degree of reliability in the recording and subsequent reading of such data. In order to achieve such reliability the data recording tape is normally provided with at least seven tracks. As a consequence, to insure accurate recording on the tracks and accuracy in the subsequent reading of the data, the angular relationship of the tape to the recording or reading head must be held down to about 8 minutes of arc. In other words, the longitudinal dimension of the tape must be perpendicular with respect to the recording or reading head within the prescribed limits.

Accordingly, for the purposes of providing the aforesaid high degree of reliability, it is necessary to have the tape cartridge fitted to the receiving compartment to very close tolerances. Furthermore, it is absolutely necessary that the cartridge be located extremely accurately and firmly held within the compartment. Only if such desiderata are fulfilled will the tape cartridge be operable so as to realize a very high degree of accuracy and reliability.

A further requirement is imposed, also in furtherance of the objective of high reliability, which is that the benefits derived from capstan driving of the recording medium be realized. Such capstan driving is a well-known arrangement in the art and its essential purpose is to provide constant speed for the tape at all times. What is usually provided is a slipping clutch in association with the takeup or drive reel, and a drag clutch in association with the supply reel. This arrangement entails the coincident driving of both the capstan and the shaft for the takeup reel. For an appreciation of such a driving mechanism, reference may be made to the U.S. Pat. to Yefsky, No. 3,276,708.

It will, therefore, be appreciated that a number of stringent requirements are imposed on the design of a tape recorder, and, particularly the tape cartridge, for data recording related to meter reading.

Therefore, it is a primary object of the present invention to fulfill all these requirements and to provide efficient and reliable recording of digital data.

Another object is to enable extremely accurate placement of the tape cartridge within its receiving compartment so that the tape is positioned and held firmly and substantially perpendicular to the recording head.

Yet another object is to latch the tape cartridge accurately in position within its compartment and to enable the proper engagement of the tape reels in the cartridge with corresponding driving shafts.

Still another object is to provide a spring mechanism within the tape cartridge that is effective to brake the tape reels when the cartridge is removed from its compartment and automatically to release the brake when the cartridge is inserted.

Yet another object is to provide a spring mechanism that will enable releasing the brake for the reels while bringing the tape into engagement with the capstan.

A further object is to provide a spring mechanism for performing the above stated functions and at the same time to enable rejection of the cartridge despite its very close fit within the receiving compartment.

Accordingly, a primary feature of the present invention resides in a latching mechanism for a tape cartridge which includes the provision of spring loading means for the brake and drive shafts of the recorder. More specifically, the latching mechanism comprises a movable latch plate which is operable in response to the movement of a pair of latch pins, the latch pins being actuated by the insertion of the tape cartridge, whereby the latch plate causes retraction of the brake and drive shafts against the normal bias of their respective spring loading means such that the tape cartridge can then be fully inserted into its receiving compartment. Upon full insertion of the tape cartridge, the latch pins are enabled to move into suitably provided recesses in a wall of the tape cartridge, whereupon the return of the latch plate to normal position permits the brake and drive shafts to engage with the hubs of the supply reel and takeup reel, respectively, which reels are contained within the tape cartridge. In order to remove the tape cartridge from its operating position within the receiving compartment, an integral release handle is moved and in response thereto the movable latch plate acts to withdraw the latch pins from their recesses and to cause retraction of the brake and drive shafts so that the cartridge can be readily ejected.

In accordance with another primary feature of the present invention, broadly stated, there is provided a spring mechanism which is effective to operate a brake against the tape reels when the cartridge is out of its receiving compartment and to release such brake when the cartridge is inserted into the compartment. More specifically, the spring mechanism includes a pivoted lever which is biased by a spring centrally located inside the cartridge casing. The lever carries at one end the aforesaid pressure roller, and at the other end a brake shoe which is adapted, by dint of the normal bias of the spring, to engage the rims of both tape reels when the pressure roller is not engaging the capstan. However, when the pressure roller carries the recording tape against the capstan, the lever lifts the brake show away from the reels. The same spring mechanism is also effective when the latching mechanism is released, as described above, for yet another purpose. Thus, when the aforesaid latch release handle is actuated, and as a consequence, the latch pins and the brake and drive shafts are all withdrawn, the pressure roller can then act against the capstan, thereby kicking out the cartridge from its compartment.

The foregoing and other objects, features and advantages of the invention will be apparent from the following more particular description of preferred embodiments of the invention, as illustrated in the accompanying drawings.

DESCRIPTION OF PREFERRED EMBODIMENT

Figure 1:
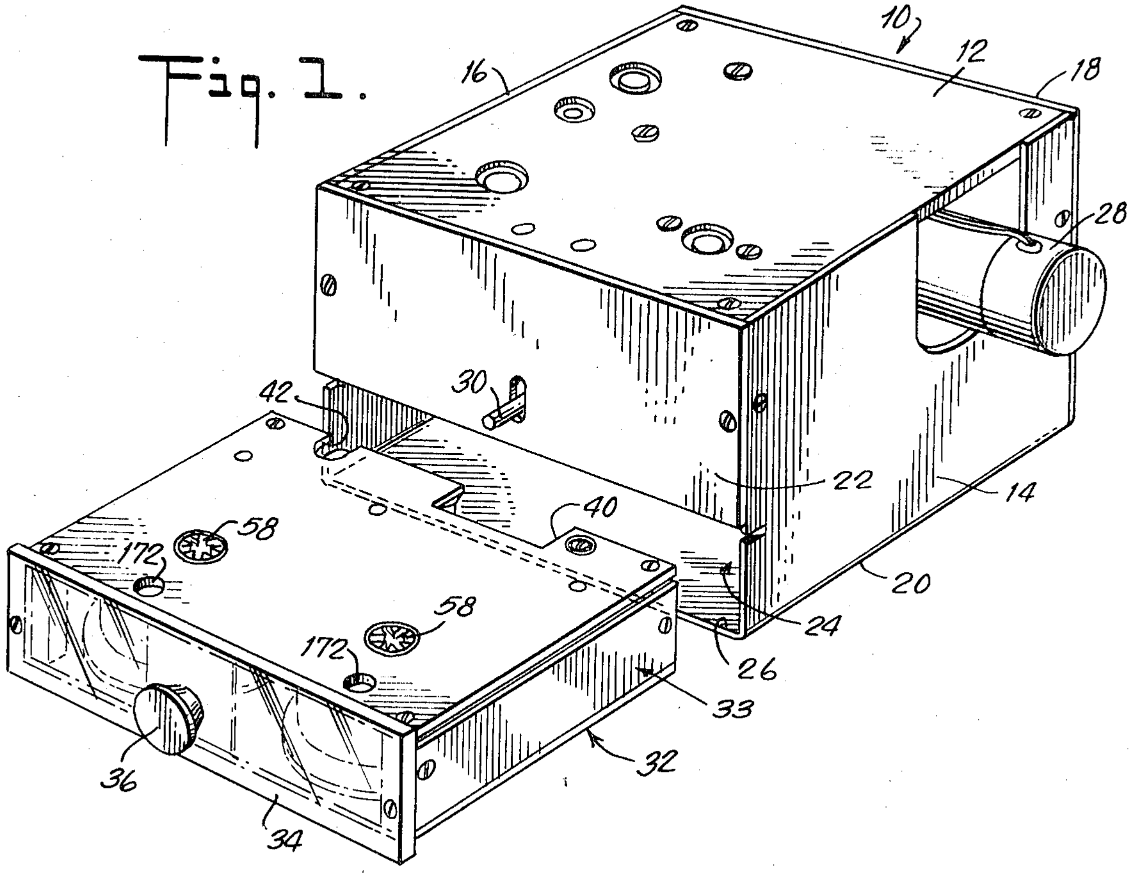
FIG. 1 is a perspective view of the tape recorder and tape cartridge in accordance with the present invention.
Figure 2:
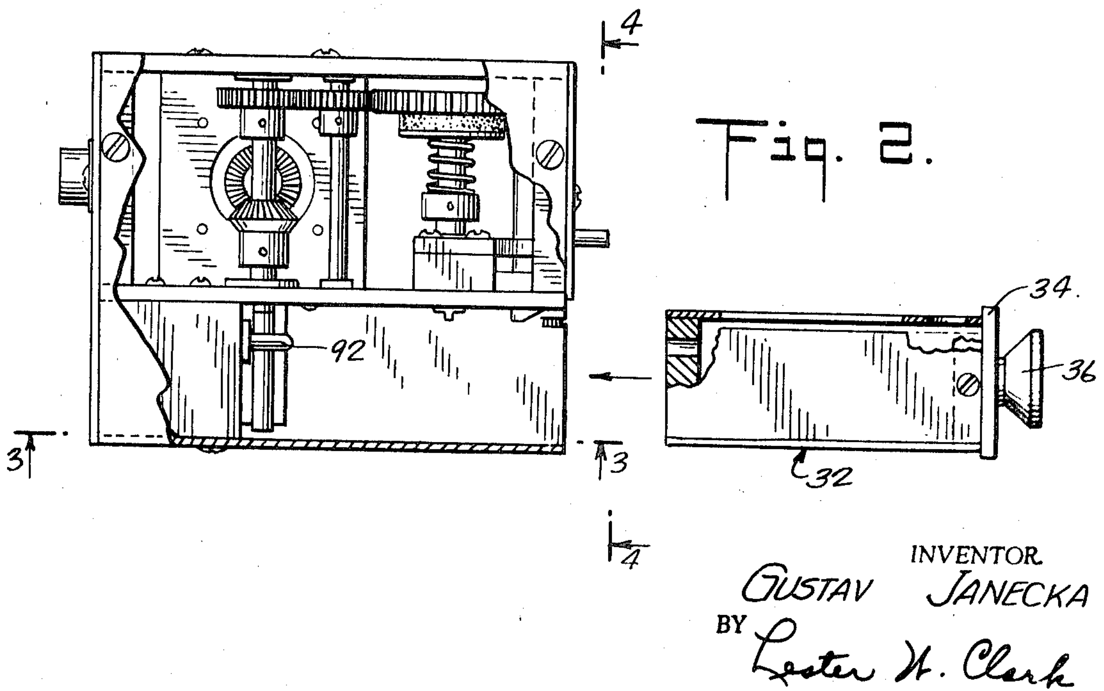
FIG. 2 is a side view, broken away, showing parts of the tape recorder and illustrating the tape cartridge about to be inserted into its receiving compartment.
Figure 3:
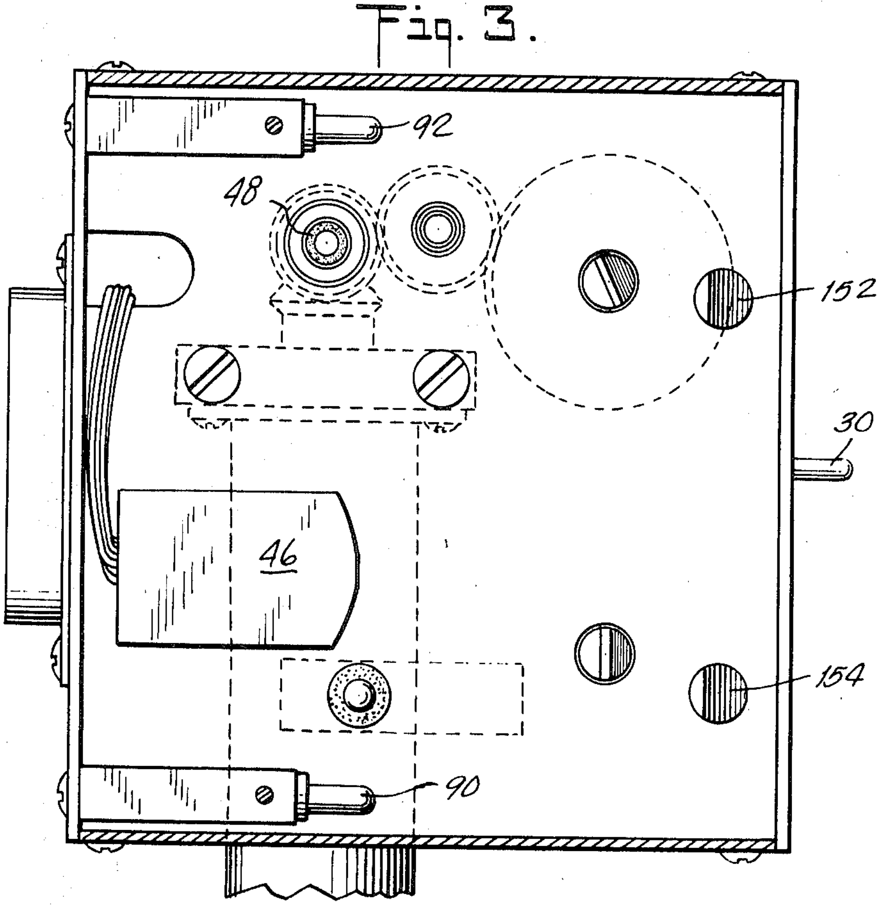
FIG. 3 is a bottom plan view of the tape recorder.
Figure 4:
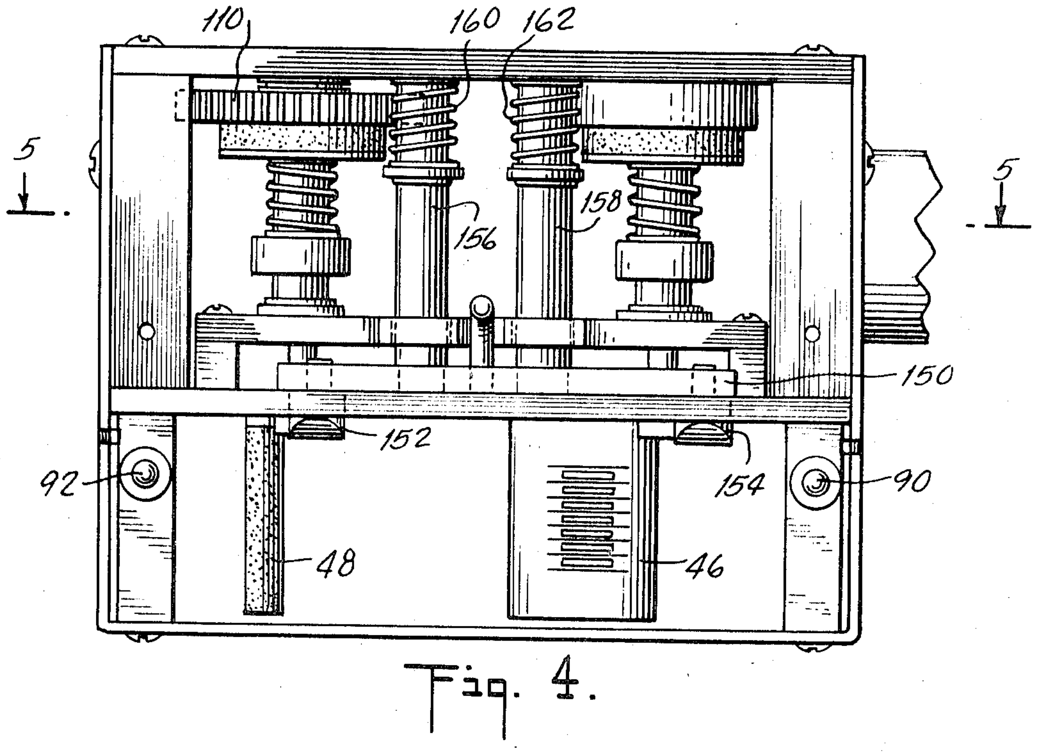
FIG. 4 is a front view of the tape recorder with portions removed to show the internal mechanisms of the tape recorder.
Figure 5:
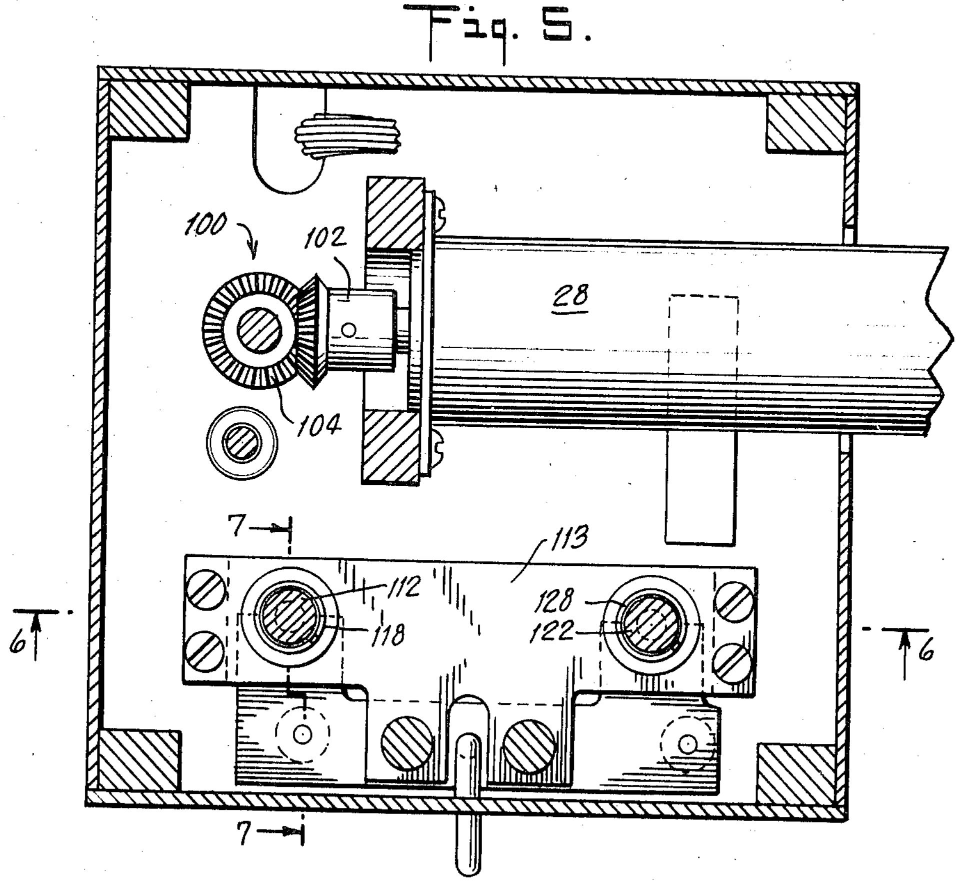
FIG. 5 is a horizontal section view taken on the line 5–5 in FIG. 4.

Referring now in detail and by reference characters to the drawings which illustrate a preferred embodiment of the present invention, there is shown a tape recorder comprising a generally rectangular outer housing 10, including a top wall 12, sidewalls 14 and 16, rear wall 18, bottom wall 20 and front wall 22. A compartment 24 is defined within the interior of the housing 10, being provided with an opening 26 in the front wall 22.

Projecting through the sidewall 12 is a conventional speed governed motor 28 for indirectly driving the tape medium in a manner to be explained. A latch release handle 30 is seen projecting through an opening in the front wall 22 for the purpose of permitting partial ejection of the tape cartridge 32.

The tape cartridge 32 is adapted to be received within the compartment 24 of the housing 10 and to be very precisely located and fitted within such compartment. This is for the reason alluded to previously; namely, that for the purposes of data recording with a high degree of reliability, it is extremely important that the tape cartridge be accurately positioned so that the tape medium will be, within very close tolerances, in precise angular relationship with the recording head. The tape cartridge 32 comprises a generally rectangular casing 33, having top, bottom, side and rear walls constituted preferably of metal and being provided with a front panel 34 which is desirably made of a transparent, synthetic resin. By reason of this transparent panel, the workings of the tape reels within the casing can be observed, and thus usage of the tape can be monitored. Conveniently, the rims of the tape reels are color-marked to serve as a check on the rotation of the release.

Figures 7, 8, 9, 10:
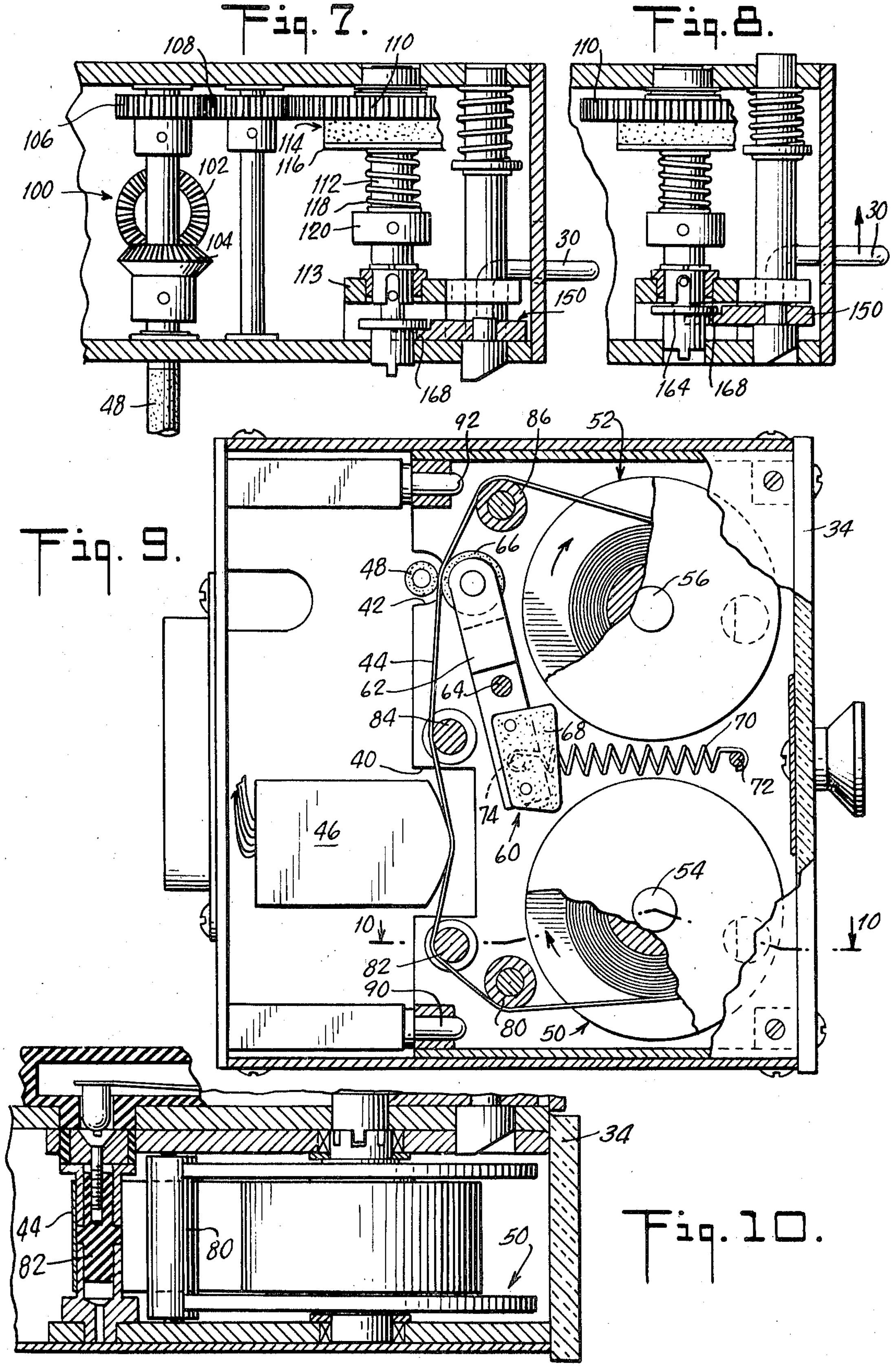
FIG. 7 is a vertical sectional view taken on the line 7–7 in FIG. 5, and particularly illustrating the drive mechanism and the drive shaft for the takeup reel.
FIG. 8 is a fragmentary view, illustrating certain of the parts previously shown in FIG. 7 and particularly illustrating a different position for the parts in response to movement of the latch handle.
FIG. 9 is a bottom view of the tape recorder, particularly illustrating the tape cartridge in fully inserted position within its receiving compartment.
FIG. 10 is a vertical sectional view taken on the line 10–10 in FIG. 9.

The front panel 34 has a knob 36 for convenience in manipulating the cartridge. The rear of the tape cartridge is provided with a plurality of openings 40 and 42 shaped so as to accommodate and to enable cooperative relationships with elements within the recorder housing. Thus, the opening 40 is designed such that the tape 44 (see FIG. 9) may make contact with the recording head 46 when the cartridge 32 is loaded into operative position as seen in FIG. 9. Similarly, the opening 42 allows for engagement of the tape 44 with the capstan 48. Disposed within the cartridge casing are a pair of reels 50 and 52, the former being a supply reel and the latter, a takeup reel which is to be driven. The respective hubs 54 and 56 of the reels project through the top wall of the cartridge casing 33, as best seen in FIG. 1, the ends of these hubs having a plurality of spaced slots 58 to allow for ready engagement by the ends of cooperating shafts.

Also disposed within the cartridge casing is a spring mechanism 60 comprising a lever arm 62 pivotably mounted by means of the pivot 64. Journaled at one end of the lever arm 62 is a pinch or pressure roll 66, and at the other end, a loosely mounted brake shoe 68. The lever arm is spring-biased to urge it counterclockwise around the pivot 64, the spring means 70 having one of its ends looped about a fixed pin 72 mounted to a wall of the casing and having its other end looped about a pin 74 on the lever arm 62. The action of the spring-bias under normal conditions, that is, when the tape cartridge is removed from the housing 10, is to urge the brake shoe 68 to move into engagement with the rims of the reels 50 and 52, thereby preventing their movement.

Also included within the tape cartridge casing are a plurality of conventional guide rolls 80, 82, 84 and 86, for suitably guiding the tape past the recording head 46 and into engagement with the capstan 48.

It will be noted that the rear of the compartment 24 is provided with spaced, locating pins 90 and 92 which fit into recesses 94 and 96 in the casing 33. These pins assist in precisely locating the tape cartridge within its compartment.

Referring now to the interior details of the housing 10, it will be appreciated that, except as noted hereinafter, conventional parts are provided therein for driving the tape and for the proper operation of the tape reels 50 and 52. Thus, power is applied from the drive motor 28 to takeup reel 56 through a gear train 100, comprising a succession of gears 102, 104, 106, 108 and 110. Power is applied to the capstan 48 from a shaft connected with gear 104. Thus power is applied to the capstan coincidentally with the application thereof to the drive shaft 112, journaled at one end in the top wall of the housing 10 and at the other end in a fixed plate 113. The shaft 112 is operative to effect indirectly rotation of the takeup reel 56 in the tape cartridge. Movement of the gear 110 operates to drive the shaft 112 through the medium of slipping clutch 114 which has a ring or plate 116 carried by the shaft 112, the plate being spring-biased by means of the spring 118 which is contained at its opposite end by the collar 120 on the shaft 112.

Figure 6:
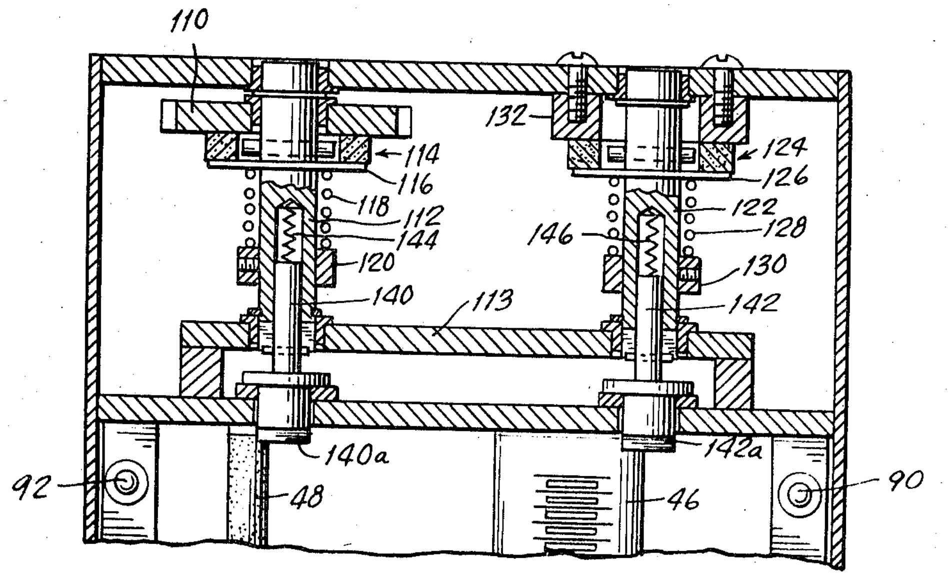
FIG. 6 is a vertical sectional view taken on the line 6–6 in FIG. 5, particularly illustrating the spring loading of the drive and brake shafts of the tape recorder.

Referring particularly to FIG. 6, it will be seen that a very similar arrangement is provided in respect of the association of the shaft 122 with the supply reel 54. Thus, similar elements in the form of clutch 124, plate 126, spring 128 and collar 130 are provided. However, in this instance the clutch is a drag clutch, or, in other words, is operative as a brake for preventing overrunning of the supply reel. The drag clutch 124 frictionally engages a plate 132 which is fixedly mounted to the housing 10. Accordingly, a permanent braking action is applied to the supply reel 54 as the tape 44 is driven by the capstan 48 and the drive is coincidentally applied to the takeup reel 56. For actual engagement with the respective reels 50 and 52 there are provided inner shafts 140 and 142 coupled respectively with the outer shafts 112 and 122. As will be seen by reference to FIG. 6, the shafts are adapted to extend through suitably provided openings in the top wall of the compartment 24, their lower ends being restrictively dimensioned so as to be fittable, when extended, within the slots 58 of the hubs 54 and 56, respectively.

It will be seen in FIG. 6 that the upper ends of the shafts 140 and 142 are spring loaded by the respective spring means 144 and 146. Thereby the inner shafts 140 and 142 are retractable as part of the latching mechanism of the present invention. Such latching mechanism also comprises a movable latch plate 150 to which are integrally affixed latch pins 152 and 154, which extend, except when actuated, through suitable openings in the top wall of compartment 24. The release handle 30 is fixedly secured to the movable latch plate 150 and similarly a pair of studs 156 and 158 are fixedly secured at their lower ends to the latch plate. The other ends of the studs 156 and 158 are suitably journaled in the top wall of the recorder housing 10, these studs being spring-biased by the spring means 160 and 162 respectively so as to urge the movable latch plate into latching position.

OPERATION

Consider now the operation of the tape recorder, and in particular, of the latching mechanism of the present invention, and also of the spring mechanism feature. When the tape cartridge 32 has been inserted sufficiently far, the rear portion of the casing strikes the latch pins 152 and 154. Responsive thereto, the latch plate 150 moves against the normal bias of the springs 160 and 162. Consequently, the projecting tips **140*a* and 142*a* of the shafts 140 and 142 respectively are moved out of the way because of the engagement of the collars 164 and 166 on these shafts by the shoulders 168 and 170 on the latch plate 150**.

As the tape cartridge approaches its fully inserted position, the pressure roll 66 on the lever 62 comes into engagement with the capstan 48 and pinches the tape against the capstan. Responsive to such engagement the lever pivots about point 64 and against the normal spring bias of the spring 70, whereby the brake 68 is moved out of its normal contact with the rims of the tape reels, thus freeing the tape reels for subsequent rotation. (See FIG. 9).

As the tape cartridge reaches its fully inserted position, the previously retracted shafts 140 and 142 are free to move into the suitably provided slots 58 in the hubs 54 and 56. Concomitantly, the latch pins are free to move into the recesses 172 provided in the top wall of the casing 33.

Electrical power is applied to the motor 28 by actuation of an appropriate switch which is part of the external controls of the recorder. Accordingly, the tape 44 is driven past the recording head 46 and the information relating to the meter reading is recorded. In order to effect removal of the tape cartridge when the recording operation is completed, the release handle 30 is moved upwardly. (See FIGS. 7 and 8). As a result of the upward movement, the movable latch plate carries the latch pins out of their recesses and retracts the shafts 140 and 142. Now the way is cleared for forward ejection of the tape cartridge. This is accomplished by dint of the action of the spring mechanism. In other words, because of the spring 70 means being urged counter to its normal bias, the resultant force of pressure roll 66 against the capstan 48 will cause the cartridge to be ejected part way from the compartment 24. This, of course, facilitates ready removal of the tightly fitted cartridge from its compartment.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What I claim is:

1. A latching mechanism for latching a tape cartridge within a compartment in a tape recorder housing, comprising a pair of latch pins adapted to be received in recesses in said tape cartridge; a pair of spring-loaded shafts adapted to engage a pair of reels contained within said tape cartridge; means operatively connecting said latch pins and said shafts such that said latch pins are responsive to insertion within said compartment of the tape cartridge to produce retraction of said shafts until said cartridge is fully inserted.

2. A latching mechanism as defined in claim 1, in which said means comprises a movable latch plate to which said latch pins are integrally affixed, said latch plate operative to retract said spring-loaded shafts.

3. A latching mechanism as defined in claim 2, further comprising a release handle fixedly secured to said movable latch plate for actuation of said latch plate thereby to retract said spring-loaded shafts.

4. A latching mechanism as defined in claim 3, further comprising a pair of studs fixedly secured to said latch plate and spring means for respectively biasing said studs so as to urge the movable latch plate into latching position.